No. 12,503. REISSUED JULY 10, 1906.

W. VOLKEL.

BELT REPLACER.

APPLICATION FILED MAR. 1, 1906.

WITNESSES:

W. F. Kayle.

N. Curtis Lammond

INVENTOR

William Volkel.

BY H. H. Bliss

Attorney

THE NORRIS PETERS CO., WASHINGTON, D. C.

UNITED STATES PATENT OFFICE.

WILLIAM VOLKEL, OF PERRYSVILLE, INDIANA.

BELT-REPLACER.

No. 12,503. Specification of Reissued Letters Patent. Reissued July 10, 1906.

Original No. 798,238, dated August 29, 1905. Application for reissue filed March 1, 1906. Serial No. 303,733.

*To all whom it may concern:*

Be it known that I, WILLIAM VOLKEL, a citizen of the United States, residing at Perrysville, in the county of Vermilion and State of Indiana, have invented certain new and useful Improvements in Belt-Replacers; and I do declare the following to be a full, clear, and exact description of the invention, such as will enable others skilled in the art to which it appertains to make and use the same.

My invention relates to belt-replacers, and has for its principal object to provide a device of simple construction by which a belt may be quickly placed on the driving-pulley of a traction or other engine.

A further object of the invention is to provide a device of this character which may be instantly placed in position and which will be held in operative position during the replacing operation by the stress of the belt, any auxiliary securing means being unnecessary.

A still further object of the invention is to provide a novel device of this character which may be readily adjusted to suit belts and pulleys of different sizes.

With these and other objects in view, as will more fully hereinafter appear, the invention consists in certain novel features of construction and arrangement of parts hereinafter fully described, illustrated in the accompanying drawings, and particularly pointed out in the appended claims.

Figure 1:
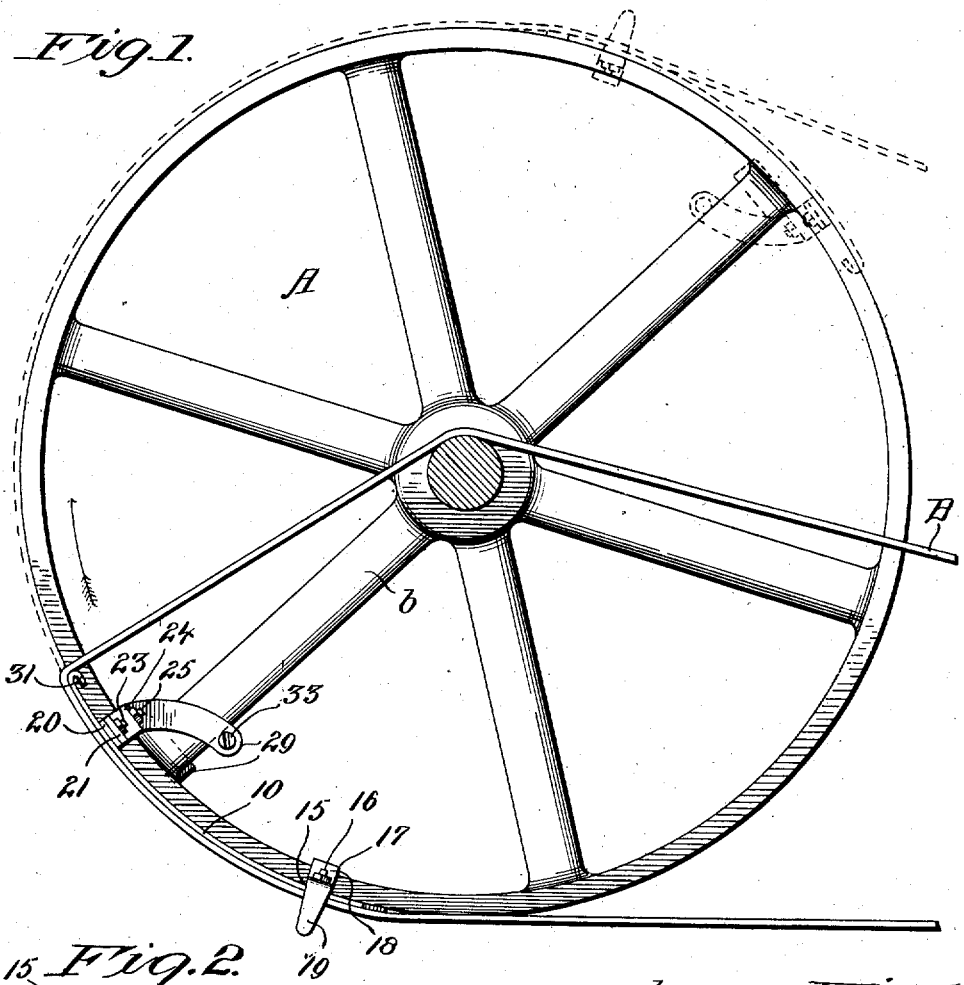
Figure 2:
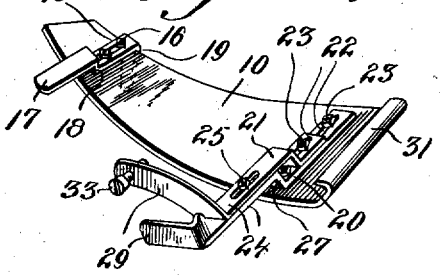
Figure 3:
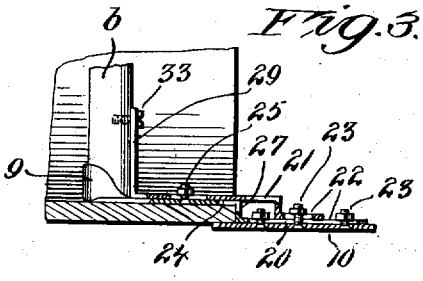

In the accompanying drawings, Figure 1 is a side elevation illustrating a pulley provided with a belt-replacer constructed in accordance with the invention, the full-line position showing the starting of the operation and the dotted-line position the completion thereof. Fig. 2 is a detail perspective view of the belt-replacer detached. Fig. 3 is a transverse sectional view of the device, showing the same in position on the rim of a pulley.

Similar characters of reference are employed to indicate corresponding parts throughout the several figures of the drawings.

The belt-pulley A is of any ordinary type and is designed to receive the belt B.

The belt-replacer forming the subject of the present invention is in the form of a metallic plate 10, which preferably is curved on a line corresponding to the periphery of the pulley and is preferably tapered in width. The main portion of the plate 10 when the replacer is in position on the pulley extends laterally to one side of the pulley-rim in contradistinction to lying superposed thereupon, its inner edge extending a short distance over the outer edge of the pulley-rim, as represented in Fig. 3, and to its inner face are secured rim-engaging brackets, the connections being preferably adjustable in order that the device may be applied to pulleys of different sizes. The bracket near the narrower end of the plate is formed of a strip 15, having a slot for the passage of securing-bolts 16, and one end of the strip is bent to form a tongue 17, that bears against the inner face of the pulley-rim, the shoulder 18 at the end of the tongue forming a stop for engagement with the edge of the rim. The opposite end of the strip 15 is bent outward to form a guard 19, which engages against the edge of the belt B and serves to force the belt laterally onto the periphery of the pulley. Near the wider end of the plate 10 is arranged a bracket formed of two members 20 and 21, the shank portions of which are superposed and are provided with slots 22 for the passage of securing-bolts 23. These brackets are bent to form tongues 24, which bear against the inner face of the rim of the pulley, and the tongues are slotted for the passage of a bolt 25 to permit independent adjustment of said brackets. One of the brackets is provided with a shoulder 27, which engages against the edge of the pulley-rim, and at the inner end of each tongue is an arm 29, the said arms being disposed in spaced relation and arranged to engage, respectively, at opposite sides of one of the spokes *b* of the pulley, the spoke serving as a means for carrying the belt-replacing plate around with the pulley. The wider end of the plate is beaded, as indicated at 31, in order to prevent injury to the belt, and when the device is to be employed to replace a belt it is adjusted to the position shown in full lines in Fig. 1, the belt being passed over the beaded end of the plate and within the line of the guard 19. The pulley is then turned in the direction indicated by the arrow, and movement is transmitted to the plate by means of the spoke *b*. The belt is thus carried around the pulley, and by the time the device has reached the position shown in dotted lines in Fig. 1 the belt will be fully on the pulley, it being necessary to engage only the edge of the belt with the periphery of the pulley, the belt climbing to the central position in the usual manner. When the belt-replacer reaches the position shown by dotted lines, it may be readily removed by hand or may fall from position. In some cases where the belt is exceptionally heavy a set-screw 33 may be employed for locking the replacer to one of the spokes of the pulley.

The plate 10 is preferably formed of metal of a more or less yieldable nature in order that it may automatically conform to the curvature of pulley-rims of different diameters.

It will be seen that a device having the characteristics of my invention furnishes support for the belt on two or more lines peripherally remote from each other and approximately parallel to the axis of the wheel—that is to say, my replacer has a relatively forward belt-supporting part, this being in the device illustrated the wider forward end, and a relatively rearwardly belt-supporting part, which is shown as the narrower opposite end, the latter having a radially-extending belt stop or holder to prevent lateral escape or slipping of the belt at the time the wheel is initially set into motion to commence the operation of putting the belt in place.

It will be understood that although I have shown the upper part of the belt B as resting upon the shaft or hub of the wheel this is not a necessary matter, as the replacer is well adapted to initially hold a belt and guide it upon the rim of a wheel, even if it is in the first instance hooked upon the replacer only irrespective of the shaft or hub, it being remembered that in the traction-engines above mentioned the belt-pulley is at the end of the engine-shaft with little or none of the shaft projecting through the wheel.

Having thus described the invention, what is claimed is—

1. A belt-replacer including a plate arranged to extend laterally from the edge of the pulley and curved to approximately conform to the curve of the periphery of the pulley and adapted to extend partly over the rim and held in place by the engagement of the pulley therewith, said plate being provided with means for engaging the inner face of the pulley-rim.

2. A belt-replacer including a curved plate having a portion arranged to overlap the pulley-rim, said plate being tapered in width and provided near its narrower end with a guard for engaging the edge of the belt.

3. In a belt-replacer, a curved plate having a turned or beaded end a portion of which is cut away to permit said plate to partly overlap the pulley-rim, and brackets or tongues carried by the plate and arranged to engage against the inner face of the rim.

4. A belt-replacer in the form of a curved plate arranged to extend laterally from one edge of the pulley-rim and having laterally-adjustable members for engagement with the inner face of the pulley-rim.

5. A belt-replacer in the form of a curved plate tapering inward and provided at its narrower end with a belt-engaging guard, and brackets or tongues secured to the plate and arranged to engage the inner face of the pulley-rim.

6. A belt-replacer comprising a curved plate having a beaded end for engagement with the belt, and a pair of bracket members having arms for the reception of one of the spokes of the pulley.

7. A belt-replacer comprising a curved plate formed of yieldable or elastic material whereby the plate is conformable to the curvature of a pulley-rim and adapted to extend partly over the rim of the pulley, and into engagement with the periphery thereof, and provided with members for engaging the inner face of the pulley-rim.

8. A belt-replacer including a belt-engaging and supporting part arranged to extend laterally from the edge of a pulley-rim and also to extend partly over the rim, and held in place by engagement of the belt therewith, said part being provided with means widely separated from each other for engaging the inner face of the pulley-rim along one of its edges.

9. A belt-replacer comprising a belt engaging and supporting part arranged to extend laterally from the edge of the rim of the pulley, and also to extend partly over the outer edge thereof, such part having a front edge approximately parallel with the face of the pulley and arranged to engage with the bight of the belt, and having also a part upon which the belt lies arranged substantially in the plane of the pulley-rim, widely-separated means carried by the said part arranged to engage with the inner face of the pulley-rim to assist in holding the replacer upon the pulley, and an inwardly-extending arm secured to the belt engaging and supporting part of the replacer near its front end, and arranged to loosely engage with one of the spokes of the pulley, whereby the replacing device is held in position by the belt until the latter is seated upon the pulley and is then free to automatically disengage therefrom, substantially as set forth.

10. A device for automatically guiding a belt and seating it upon the periphery of a pulley-wheel having a belt engaging and supporting device adapted to project laterally from the edge of the wheel-periphery and arranged to support the belt being replaced in proximity to the wheel-rim and on lines peripherally remote from each other, and provided with a spoke-engaging arm adapted to laterally engage with the rear edge and inner face of a spoke, and provided with a guard arm or finger extending radially outward from the rear portion of the said belt engaging and supporting device, the said parts being arranged substantially as set forth, whereby the replacing device is held in position by the belt until the latter is seated upon the wheel and then automatically disengages and drops from the wheel.

11. A belt-replacer adapted to be attached to the rim and spokes of a pulley and to be automatically detached therefrom, having a relatively forward belt-supporting part and a relatively rearward belt-supporting part, the part which is relatively rearward being provided with a stop or guard arranged to engage with the edge of the belt and the relatively forward part being arranged to engage with the bight of the belt to be replaced, substantially as set forth.

12. A belt-replacer adapted to be attached to the rim and spokes of a pulley and to be automatically detached therefrom, having a relatively forward belt-supporting part and a relatively rearward belt-supporting part, the part which is relatively rearward being provided with a radially-arranged stop or guard to engage with the edge of the belt, and the relatively forward part being extended farther from the wheel than the rearward part, and both said forward and rearward parts being arranged substantially as described to hold the belt on lines approximating the curve of the wheel before the wheel commences its rotation, substantially as set forth.

In testimony whereof I affix my signature in presence of two witnesses.

WILLIAM VOLKEL.

Witnesses:
JOHN C. BRYANT,
GEORGE W. MOSBORGER.